No. 612,122. Patented Oct. 11, 1898.
F. SCHWEDTMANN.
ELECTRICAL CONVERTER.
(Application filed Aug. 28, 1897.)
(No Model.) 2 Sheets—Sheet 1.
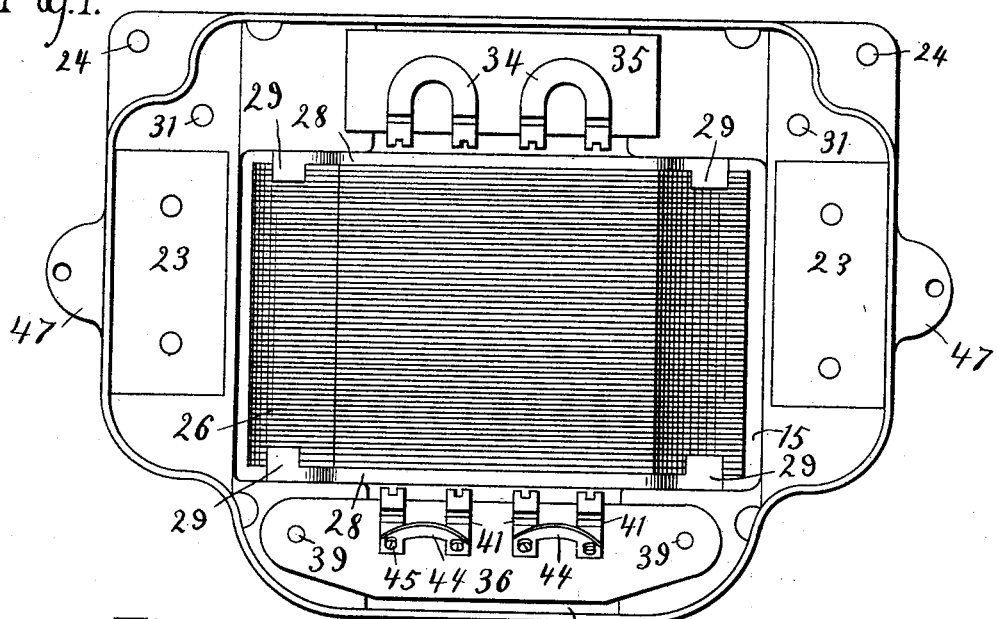
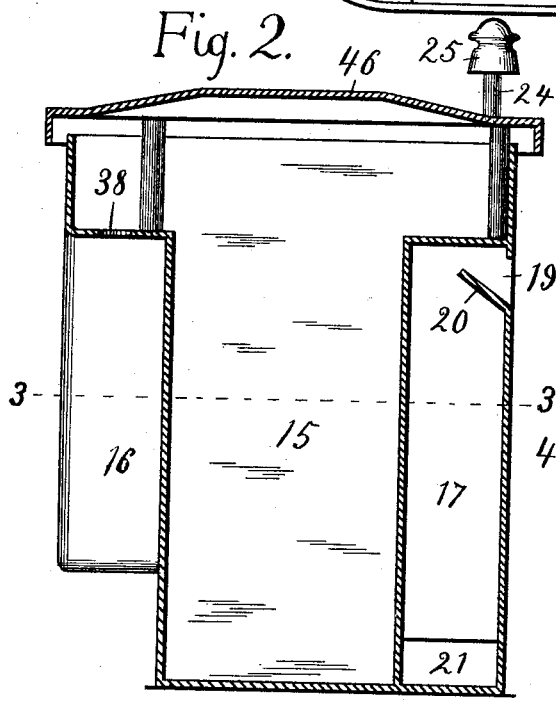
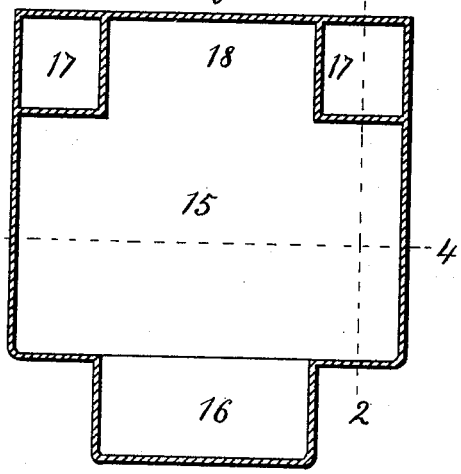
Witnesses
W. H. Alexander
Wm Allen
Inventor
F. Schwedtmann
By Attorneys
Fowler & Fowler

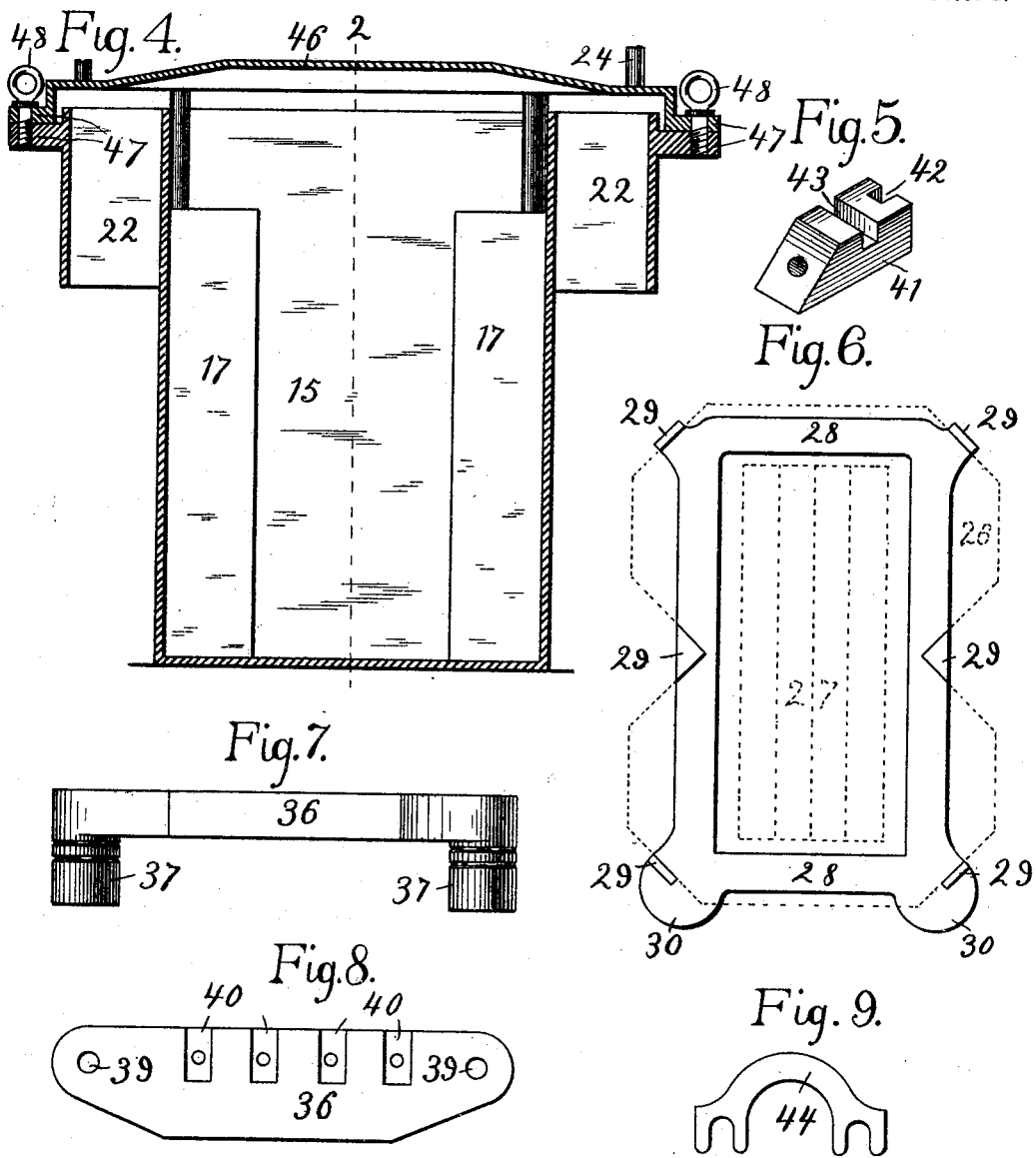

UNITED STATES PATENT OFFICE.

FERDINAND SCHWEDTMANN, OF ST. LOUIS, MISSOURI.

ELECTRICAL CONVERTER.

SPECIFICATION forming part of Letters Patent No. 612,122, dated October 11, 1898.

Application filed August 28, 1897. Serial No. 649,821. (No model.)

*To all whom it may concern:*

Be it known that I, FERDINAND SCHWEDTMANN, a citizen of the United States, residing at the city of St. Louis, in the State of Missouri, have invented a certain new and useful Converter, of which the following is such a full, clear, and exact description as will enable any one skilled in the art to which it appertains to make and use the same, reference being had to the accompanying drawings, forming part of this specification.

The object of my invention is to produce a converter which will be neat in appearance and compact and which can be used either with oil or as a dry converter, and also to provide means for holding the core in place without the use of screws or other fastening devices.

My invention consists in the various novel features and details of construction described in the following specification and pointed out in the claims affixed hereto.

In the accompanying drawings, which illustrate a converter made in accordance with my invention, Figure 1 is a top plan view on an enlarged scale, the cover being removed. Fig. 2 is a section of the box or casing on the line 2 2 of Fig. 3. Fig. 3 is a section on the line 3 3 of Fig. 2. Fig. 4 is a section on the line 4 4 of Fig. 3. Fig. 5 is an isometric projection, on an enlarged scale, of a detail. Fig. 6 is an elevation of one of the frames holding the core, the core being indicated in dotted lines. Figs. 7 and 8 are a side elevation and top view, respectively, on an enlarged scale, of a detail; and Fig. 9 is a view, also on an enlarged scale, of a detail.

Like marks of reference refer to similar parts in the several views of the drawings.

15 is the main portion or body of the box or casing of the converter. Extending from the body 15 at the front of the converter is a chamber 16 of sufficient size to admit the coils of the converter and extending to near the bottom of the box. In the rear corners of the box are formed two air-passages 17, thus leaving a chamber 18 like the chamber 16, but extending to the bottom of the box. Near the top of each of the air-passages 17 is an opening 19, Fig. 2, from the bottom of which an inclined plate 20 extends inwardly. At the bottom of each of the passages 17 is an opening 21, leading into the chamber 18. At each side of the body 15 of the box is a chamber 22, open both at the top and bottom, for the reception of a fuse-box 23.

24 are rods upon which insulators 25 for the support of the leading-in wires may be placed.

26 is the laminated core of the converter. The core 26 is of such a size as to fill the main part 15 of the box, and the coils 27 (shown in dotted line in Fig. 6) project into the chambers 16 and 18. At each side of the core 26 is placed a supporting-frame 28. On the frames 28 are projections 29, which engage with the core 26.

The core 26 is prevented from resting on the bottom of the box by the feet 30 on the frames and projecting below the core. The leading-in wires after being secured to insulators on the rods 24 are brought into the box through openings 31 and led to the fusible cut-outs 23 and from thence to suitable connecting-pieces 34, carried by a block 35 of porcelain or other insulating material, which is secured over the chamber 18. From the connecting-pieces 34 suitable wires lead to the primary coils of the converter.

Over the chamber 16 is secured a plate or slab 36 of porcelain or other suitable insulating material. Formed on the plate 36 are two downwardly-projecting cylindrical portions 37. The parts 37 pass through holes 38, Fig. 2, to the outside of the box. Passing through the plate 36 and parts 37 are holes 39. In the plate 36 are formed shallow depressions 40. In the depressions 40 are secured by screws or other suitable means metal blocks 41. The blocks 41 project beyond the edge of the plate 36 and have formed in their ends grooves 42, in which the ends of the wires leading to the secondary coils are placed and soldered. In the tops of the blocks 41 are grooves 43, in which the leading-out wires are secured by soldering. The blocks 41 are connected in groups of two or more, as is desired, by connecting-strips 44, which are secured to the inclined ends of the blocks by screws 45. The leading-out wires pass from the blocks 41 through the holes 39 to the exterior of the box. 46 is the lid of the box, which is held, preferably, by lugs 47 and eye-bolts 48 somewhat above the edges of the box and projects beyond them laterally.

My converter can be used either as a dry converter or with oil without any change, as the openings 19, through which the air enters when the converter is used dry, is high enough to prevent the escape of the oil. By the use of the passage 17 the air is admitted at the bottom of the box. The inclined plates 20 prevent foreign matter from entering the box through the openings 19. By the use of the supporting-frames 28 the core 26 is held in place without the use of screws or other fastening devices and is readily removed. By loosening the screws 45 and rearranging the strips 44 or substituting strips with more arms any desired grouping of the blocks 41 can be obtained to adapt them to the arrangement of the coils of the converter.

Having fully described my invention, what I claim as new, and desire to secure by Letters Patent of the United States, is—

1. In a converter, a suitable casing for the reception of the core, said casing communicating with the external atmosphere at or near its top, and an air passage or passages communicating with said casing at its bottom and with the external atmosphere at a point intermediate between the bottom and top of the casing, whereby the converter may be used either with or without a liquid.

2. In a converter, a suitable casing for the reception of the core, said casing communicating with the external atmosphere at or near its top, a core located vertically in said casing, side chambers into which the coils of said core project, and an air passage or passages communicating with said casing at its bottom and with the external atmosphere at a point intermediate between the bottom and top of the casing, whereby the converter may be used either with or without a liquid.

3. In a converter, a suitable casing, a main chamber in said casing, a core in said chamber, supporting-frames holding said core by means of projections engaging with the edges thereof, and side chambers into which the coils of said core project through openings in said supporting-frames.

4. In a converter, a suitable casing, a core provided with suitable coils in said casing, a block or plate of insulating material carried by said casing, bushings formed integral with said block or plate and passing through said casing to the exterior, said bushings being provided with openings for line-wires, and metallic blocks adapted to be connected to the coils of said converter and the line-wires carried by said block or plate.

In testimony whereof I have hereunto set my hand and affixed my seal in the presence of the two subscribing witnesses.

FERDINAND SCHWEDTMANN. [L. S.]

Witnesses:
JOHN F. GREEN,
W. A. ALEXANDER.